United States Patent
Chau et al.

(10) Patent No.: US 10,534,757 B2
(45) Date of Patent: Jan. 14, 2020

(54) SYSTEM AND METHOD FOR MANAGING DATA IN DISPERSED SYSTEMS

(71) Applicant: ELECTRONICS AND TELECOMMUNICATIONS RESEARCH INSTITUTE, Daejeon (KR)

(72) Inventors: Nguyen Minh Chau, Daejeon (KR); Hee Sun Won, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 751 days.

(21) Appl. No.: 15/205,673

(22) Filed: Jul. 8, 2016

(65) Prior Publication Data

US 2017/0255690 A1    Sep. 7, 2017

(30) Foreign Application Priority Data

Mar. 2, 2016    (KR) ........................ 10-2016-0025210

(51) Int. Cl.
*G06F 16/00* (2019.01)
*G06F 16/182* (2019.01)
*G06F 16/28* (2019.01)
*G06F 16/2457* (2019.01)

(52) U.S. Cl.
CPC ...... *G06F 16/182* (2019.01); *G06F 16/24578* (2019.01); *G06F 16/285* (2019.01)

(58) Field of Classification Search
CPC ... G06F 16/182; G06F 16/18265; G06F 16/25
USPC .................................. 707/827, 703
See application file for complete search history.

(56) References Cited

U.S. PATENT DOCUMENTS

| | | | | |
|---|---|---|---|---|
| 6,122,631 | A * | 9/2000 | Berbec | G06F 9/52 |
| 7,035,854 | B2 * | 4/2006 | Hsiao | G06F 21/6218 |
| 8,234,306 | B2 | 7/2012 | Saito | |
| 9,888,062 | B2 | 2/2018 | Kim et al. | |
| 2006/0015505 | A1 * | 1/2006 | Henseler | G06F 9/50 |
| 2010/0312767 | A1 | 12/2010 | Saito | |
| 2012/0166611 | A1 | 6/2012 | Kim et al. | |
| 2013/0346795 | A1 * | 12/2013 | Gladwin | G06F 12/1458 714/6.22 |
| 2014/0372361 | A1 | 12/2014 | Lee et al. | |
| 2015/0222696 | A1 | 8/2015 | Park et al. | |

FOREIGN PATENT DOCUMENTS

JP    2010286910 A    12/2010
KR    20120072908 A    7/2012

* cited by examiner

*Primary Examiner* — Thu Nguyet T Le

(57) ABSTRACT

Provided is a data management system including a master group including a data manager configured to manage data, a process manager configured to manage a process of analyzing the data, and a meta data storage unit configured to store meta data information for managing the data; and at least one work group including a work manager configured to manage resources, the data, and a data process on the basis of a scope of groups, and at least one node manager configured to manage the resources, the data, and the data process on the basis of a scope of nodes. The master group and the at least one work group are dispersed from each other.

16 Claims, 7 Drawing Sheets

SYSTEM AND METHOD FOR MANAGING DATA IN DISPERSED SYSTEMS

CROSS-REFERENCE TO RELATED APPLICATION

This application claims priority to and the benefit of Korean Patent Application No. 10-2016-0025210, filed on Mar. 2, 2016, the disclosure of which is incorporated herein by reference in its entirety.

BACKGROUND

1. Field of the Invention

The present invention relates to a data management system and method.

2. Discussion of Related Art

Recently, big data has been actively researched and used. Nowadays, the big data era has been begun with many innovations coming simultaneously from numerous sources, such as theorists, system builders, scientists or application designers.

With the increasing amounts of data as well as diverse demands on data, more and more data centers have been built geographically in many places for various data services. Each separated data center has different goals, infrastructures and software specifications. Thus, it is difficult to manage data of each separated data center in an integrated manner.

During operation of many data services, it is important to provide operation analysis for service optimization such as system failure diagnosis, error detection or access prediction. However, a system extended to analyze service tasks between separated data centers has not yet been developed, thereby reducing a possibility to apply the operation analysis for service optimization to platforms.

FIG. 1 is a block diagram of a data management system according to the related art.

For optimized operations of services, in the data management system according to the related art, task analysis clusters 20-1 to 20-4 are respectively used in data centers 10-1 to 10-4 installed separately in regions A-1 to A-4 as illustrated in FIG. 1.

However, the related art is limited in being applied to the field of big-data platform due to the following reasons.

First, there is no external cooperation among the task analysis clusters 20-1 to 20-4. That is, it is impossible to analyze a task performed through cooperation among the data centers 10-1 to 10-4.

Second, the data centers 10-1 to 10-4 have different demands for a task analysis and thus it is difficult to balance resources and maintain an optimized state. For example, one cluster has insufficient resources but another cluster does not receive a task analysis request and thus does not use resources. Thus, resources of the data centers 10-1 to 10-4 may be maintained in imbalanced states.

Lastly, the number of devices included in each of the task analysis clusters 20-1 to 20-4 is limited. Thus, according to the related art, a large amount of data cannot be processed, thereby causing fatal problems in the field of big-data platform.

In this connection, Korean laid-open patent publication No. 10-2015-0091901, entitled "Dispersed Parallel Big Data Processing System", discloses a big data processing system capable of processing big data in parallel in a dispersed manner.

SUMMARY OF THE INVENTION

Embodiments of the present invention are directed to a data management system and method based on a master group and a work group, in which users may easily obtain desired data from geographically dispersed data centers and rapidly receive a data analysis result in a big-data platform.

However, aspects of the embodiments of the present invention are not limited thereto. Additional aspects will be set forth in part in the description which follows and, in part, will be apparent from the description, or may be learned by practice of the presented embodiments.

According to an aspect of the present invention, a data management system includes a master group and at least one work group. The mater group includes a data manager configured to manage data, a process manager configured to manage a process of analyzing the data, and a meta data storage unit configured to store meta data information for managing the data. The at least one work group includes a work manager configured to manage resources, the data, and a data process on the basis of a scope of groups, and at least one node manager configured to manage the resources, the data, and the data process on the basis of a scope of nodes. In this case, the master group and the at least one work group are dispersed from each other.

According to another aspect of the present invention, a data management method performed by a data management system includes receiving a first data write request or a first data read request from a user by a data manager of a master group, or receiving a first data process request from the user by a process manager of the master group; producing a list of work groups corresponding to the first data write request, the first data read request, or the first data process request and arranged in a rank order, and providing the user with the list of work groups by the data manager or the process manager; and receiving, from the user, a second data write request, a second data read request, or a second data process request by a work manager included in at least one work group selected from the list of work groups by the user, wherein the second data write request, the second data read request, and the second data process request include list information of nodes. When the first and second data write requests are received from the user, information regarding valid nodes is transmitted to the user on the basis of the list information of nodes, in response to the second data write request. When the first and second data read requests are received from the user, information regarding valid nodes is transmitted to the user on the basis of the list information of nodes, in response to the second data read request. When the first and second data process requests are received from the user, a data process allocation request is transmitted to a node manager corresponding to the nodes, and the node manager processes the data when receiving the data process allocation request.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
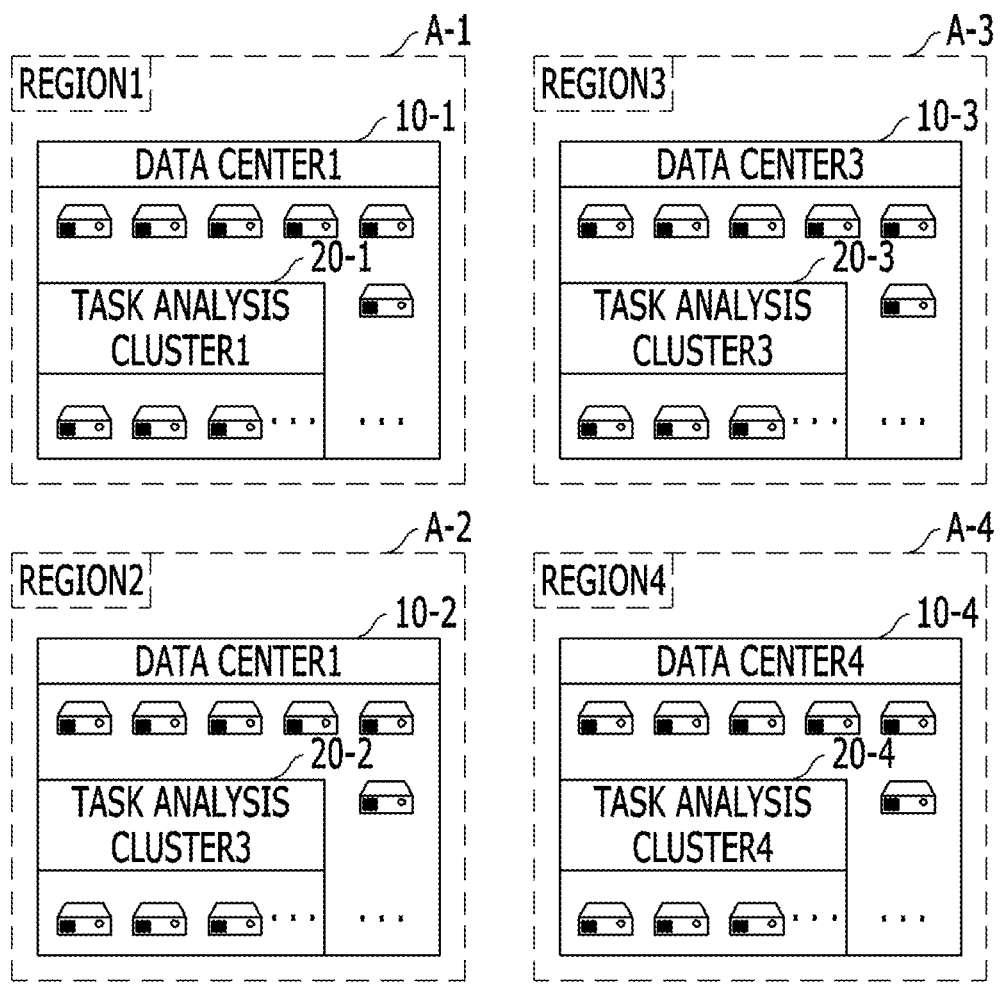
FIG. 1 is a block diagram of a data management system according to the related art.

Exemplary embodiments of the present invention will be described in detail below with reference to the accompanying drawings so that those of ordinary skill in the art can easily accomplish them. The present invention may, however, be embodied in many different forms and is not limited to the embodiments set forth herein. In the drawings, well-known functions or constructions are not described in detail if it is determined that they would obscure the invention due to unnecessary detail.

It will be understood that the terms 'comprise' and/or 'comprising,' when used in the present disclosure, specify the presence of stated features, integers, steps, operations, elements, and/or components, but do not preclude the presence or addition of one or more other features, integers, steps, operations, elements, components, and/or groups thereof unless otherwise stated.

A data management system 100 according to an exemplary embodiment of the present invention will be described with reference to FIG. 2 below.

Figure 2:
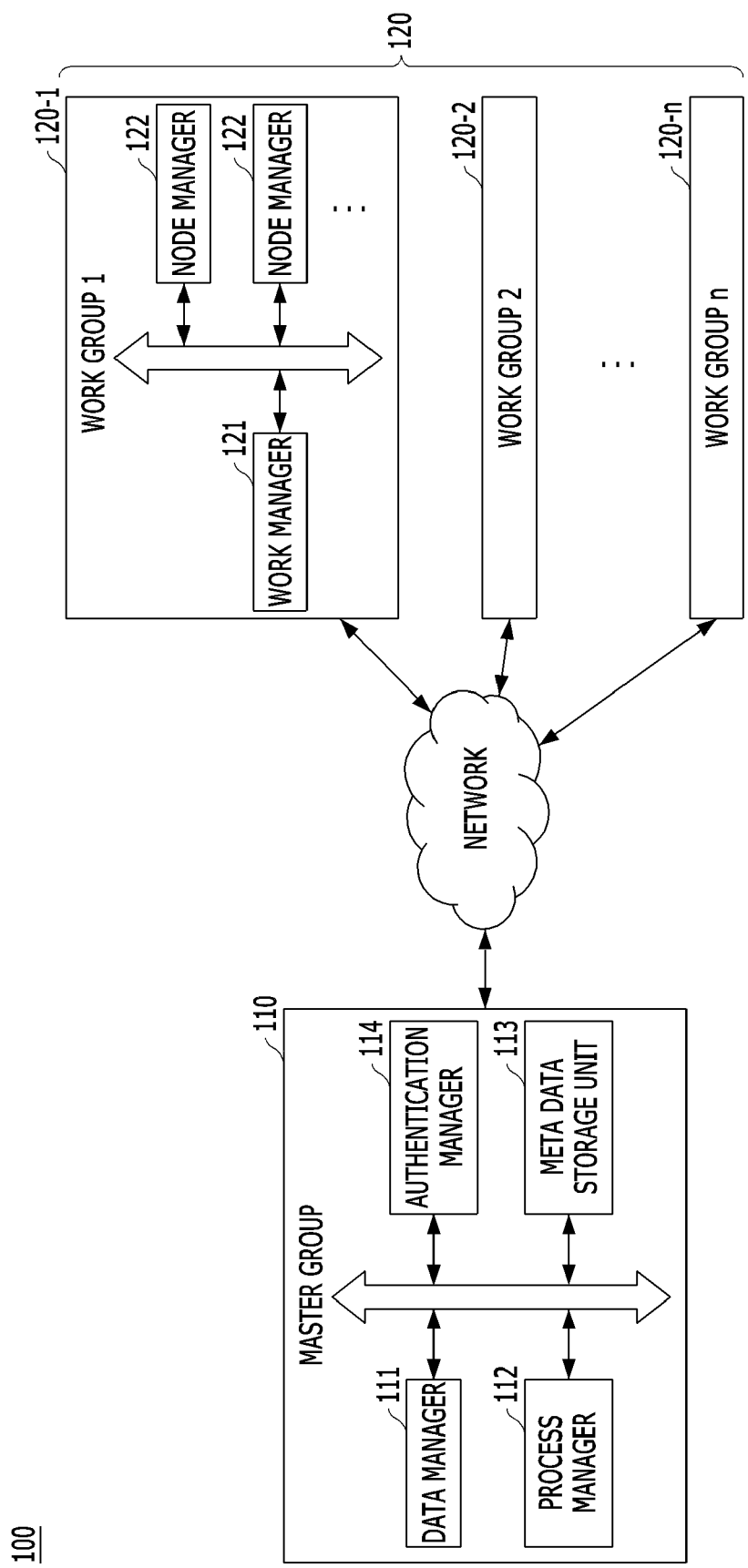
FIG. 2 is a block diagram of a data management system according to an exemplary embodiment of the present invention.

FIG. 2 is a block diagram of the data management system 100 according to an exemplary embodiment of the present invention.

The data management system 100 according to an exemplary embodiment of the present invention includes a master group 110 and one or more work groups 120-1, 120-2, . . . , 120-n (hereinafter referred to as 'at least one work group 120'). That is, in one exemplary embodiment of the present invention, data centers each include groups of devices to analyze tasks and thus the number of the data centers is equal to the number of the groups of devices. One of the groups of devices corresponds to the master group 110 and the other groups correspond to the at least one work group 120. The groups of devices are dispersed.

The master group 110 includes a data manager 111 which manages data, a process manager 112 which manages a data analysis process, and a meta data storage unit 113 which stores meta data information for managing the data. The master group 110 receives and handles a user's request, and manages information regarding all clusters using the above components.

In this case, the meta data information stored in the meta data storage unit 113 may include at least one among user information, information regarding the at least one work group 120, information regarding the amount of works allocated to the at least one work group 120, information regarding resources, information regarding applications, and configuration information of the clusters.

The at least one work group 120 includes a work manager 121 which manages resources, data, and a data process on the basis of a scope of groups, and at least one node manager 122 which manages the resources, the data, and the data process on the basis of a scope of nodes.

The master group 110 and the at least one work group 120 may be activated by being connected to each other when a data write request, a data read request, or a data process request is received from a user.

The data management system 100 according to an exemplary embodiment of the present invention may further include an authentication manager 114. The authentication manager 114 may authenticate a user, in response to an authentication request to perform a data write request, a data read request, or a data process request received from the user. In this case, when receiving the authentication request including identification (ID) and a password from the user, the authentication manager 114 may authenticate the user, based on the user information stored in the meta data storage unit 113.

According to one exemplary embodiment, each of elements of the master group 110 and the at least one work group 120 may include a communication module (not shown), a memory (not shown), and a processor (not shown).

Examples of the communication module may include both a wire communication module and a wireless communication module. The wire communication module may be embodied as a power line communication device, a telephone line communication device, a cable home (MoCA), Ethernet, IEEE1294, a unified wire home network, or an RS-485 control device. The wireless communication module may be embodied as a wireless local area network (WLAN), Bluetooth, HDR WPAN, UWB, ZigBee, Impulse Radio, 60-GHz WPAN, binary-CDMA, a wireless USB technique, a wireless HDMI technique, or the like.

The memory stores a program which controls each server. Here, the memory refers to together as a nonvolatile memory device capable of retaining information stored therein even if supply of power thereto is stopped and a volatile memory device.

Examples of the memory may include a NAND flash memory such as a compact flash (CF) card, a secure digital (SD) card, a memory stick, a solid-state drive (SSD), or a micro SD card; a magnetic computer memory device such as a hard disk drive (HDD); an optical disc drive such as a compact disc (CD)-read only memory (ROM) or a digital versatile disc (DVD)-ROM; and so on.

The elements illustrated in FIG. 2 according to one exemplary embodiment of the present invention may be embodied as software or hardware such as a field programmable gate array (FPGA) or an application specific integrated circuit (ASIC), and may perform predetermined functions.

The elements are not, however, limited to software or hardware, and may be configured to be stored in an addressable storage medium or configured to reproduce one or more processors.

Examples of the elements include elements, such as software elements, object-oriented software elements, class elements, and task elements, processes, functions, attributes, procedures, subroutines, program code segments, drivers, firmware, microcode, circuits, data, database, data structures, tables, arrays, and variables.

Elements and a function provided in corresponding elements may be combined into fewer elements or may be further divided into additional elements.

A data management method performed by the data management system 100 will be described in more detail with reference to FIGS. 3 to 5 below.

Figure 3:
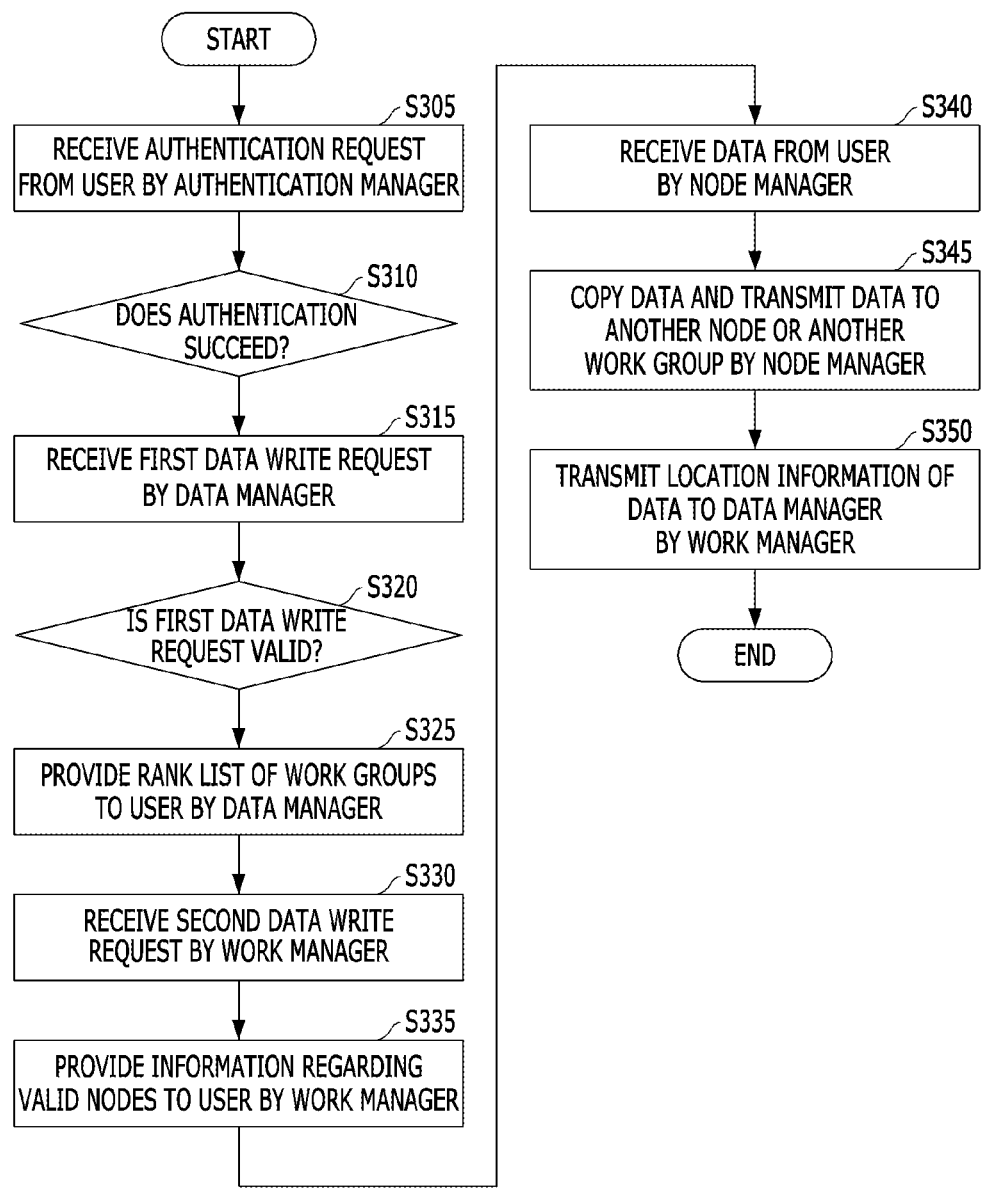
FIG. 3 is a flowchart of a data write operation of a data management method according to an exemplary embodiment of the present invention.

FIG. 3 is a flowchart of a data write operation of a data management method according to an exemplary embodiment of the present invention.

In the data write operation performed by the data management system 100 according to one exemplary embodiment of the present invention, first, the authentication manager 114 of the master group 110 performs a user authentication process when an authentication request is received from a user. That is, when receiving an authentication request including ID and a password from the user (operation S305), the authentication manager 114 authenticates the user, based on the user information stored in the meta data storage unit 113 (operation S310). In this case, when the authentication of the user fails, the authentication manager 114 may receive again an authentication request including the ID and the password from the user.

When the authentication of the user succeeds, the data manager 111 of the master group 110 receives a first data write request including an identifier of data from the user (operation S315).

In this case, the data manager 111 may determine validity of the first data write request, based on the meta data information stored in the meta data storage unit 113 (operation S320). That is, the data manager 111 may determine the validity of the first data write request, e.g., whether an access process is violated, whether a quota of resources is violated, etc. with respect to the first data write request from the user, based on the meta data information. When it is determined that the first data write request is not valid, the data manager 111 may stand by to receive the first data write request again from the user.

When it is determined that the first data write request is valid, the data manager 111 produces a list of work groups 120 which are appropriate to write the data and arranged in a rank order, and provides the user with this list, in response to the first data write request (operation S325). In this case, the list of work groups 120 may include identifiers of the work groups 120 and identifiers of nodes included in the work groups 120. The list of work groups 120 may be produced based on at least one among location information of the user, information regarding use of resources, and information regarding the amount of works allocated to the work groups 120.

Next, when the user selects at least one work group 120 from the list of work groups 120, the work manager 121 included in the selected at least one work group 120 receives, from the user, a second data write request including list information of nodes to which the data is to be written (operation S330).

The work manager 121 receiving the second data write request extracts information regarding valid nodes from the list information of nodes, and transmits this information to the user, in response to the second data write request (operation S335).

The user selects a node to which the data is to be written on the basis of the information regarding valid nodes, and transmits the data corresponding to the second data write request to the node manager 122 corresponding to the selected node. In this case, the user may also transmit information regarding the number of times of copying the data, as well as the contents of the data.

When receiving the data from the user (operation S340), the node manager 122 copies the data and transmits the data to another node or another work group 120 (operation S345). In this case, the copied data may be transmitted to a node or a work group 120 which is selected randomly, selected based on a use pattern, or selected by the user.

When the copying and transmitting of the data is completed, the work manager 121 may transmit location information of the copied data to the data manager 111 so as to update the meta data storage unit 113 (operation S350), and informs the user of the end of the data write operation.

A data read operation performed by the data management system 100 according to one exemplary embodiment of the present invention will be described with reference to FIG. 4 below.

Figure 4:
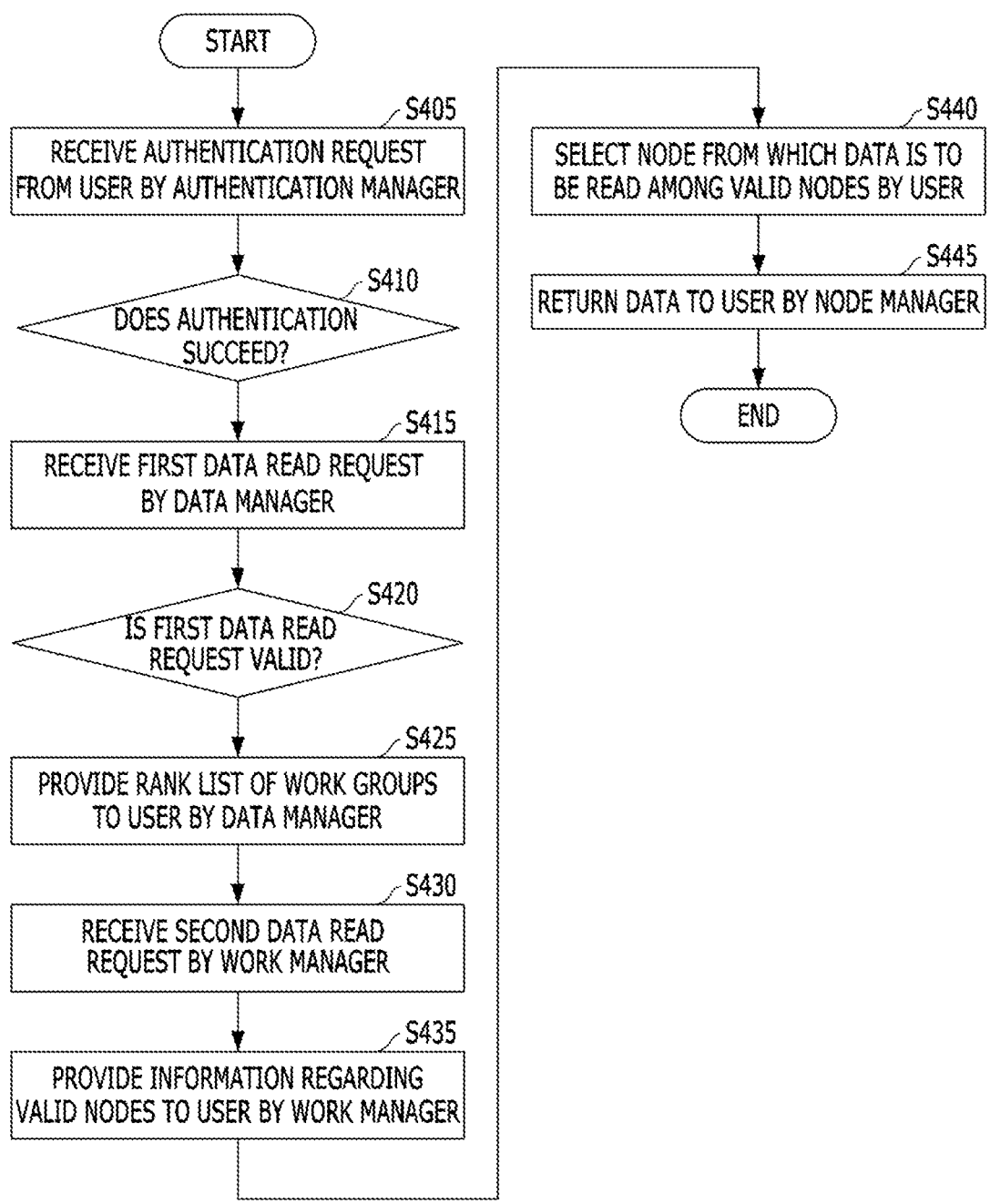
FIG. 4 is a flowchart of a data read operation of a data management method according to an exemplary embodiment of the present invention.

FIG. 4 is a flowchart of a data read operation of a data management method according to an exemplary embodiment of the present invention.

In the data read operation performed by the data management system 100 according to one exemplary embodiment of the present invention, first, when receiving an authentication request from a user, the authentication manager 114 of the master group 110 performs a user authentication process, similar to the data write operation described above.

That is, when receiving an authentication request including ID and a password from the user (operation S405), the authentication manager 114 authenticates the user, based on the user information stored in the meta data storage unit 113 (operation S410). In this case, when the authentication of the user fails, the authentication manager 114 may receive an authentication request including the ID and the password again from the user.

When the authentication of the user succeeds, the data manager 111 of the master group 110 receives a first data read request including an identifier of data from the user (operation S415).

In this case, the data manager 111 may determine validity of the first data read request, based on the meta data information stored in the meta data storage unit 113 (operation S420). That is, the data manager 111 may determine the validity of the first data read request, e.g., whether an access process is violated, whether a quota of resources is violated, etc. with respect to the first data read request from the user, based on the meta data information. When it is determined that the first data read request is not valid, the data manager 111 may stand by to receive again the first data read request from the user.

When it is determined that the first data read request is valid, the data manager 111 produces a list of work groups 120 which are appropriate to read the data and arranged in a rank order, and provides the user with this list, in response to the first data read request (operation S425). In this case, the list of work groups 120 may include identifiers of the work groups 120 and identifiers of nodes included in the work groups 120. The list of work groups 120 may be produced based on at least one among location information of the user, information regarding use of resources, and information regarding the amount of works allocated to the work groups 120.

Next, when the user selects at least one work group 120 from the list of work groups 120, the work manager 121 included in the selected at least one work group 120 receives, from the user, a second data read request including list information of nodes from which the data is to be read (operation S430).

The work manager 121 receiving the second data read request extracts information regarding valid nodes from the list information of nodes and transmits the information to the user, in response to the second data read request (operation S435).

When the user selects a node from which the data is to be read among the valid nodes (operation S440), the node manager 122 corresponding to the selected node returns the data corresponding to the second data read request to the user (operation S445).

Next, a data process operation performed by the data management system 100 according to an exemplary embodiment of the present invention will be described with reference to FIG. 5 below.

Figure 5:
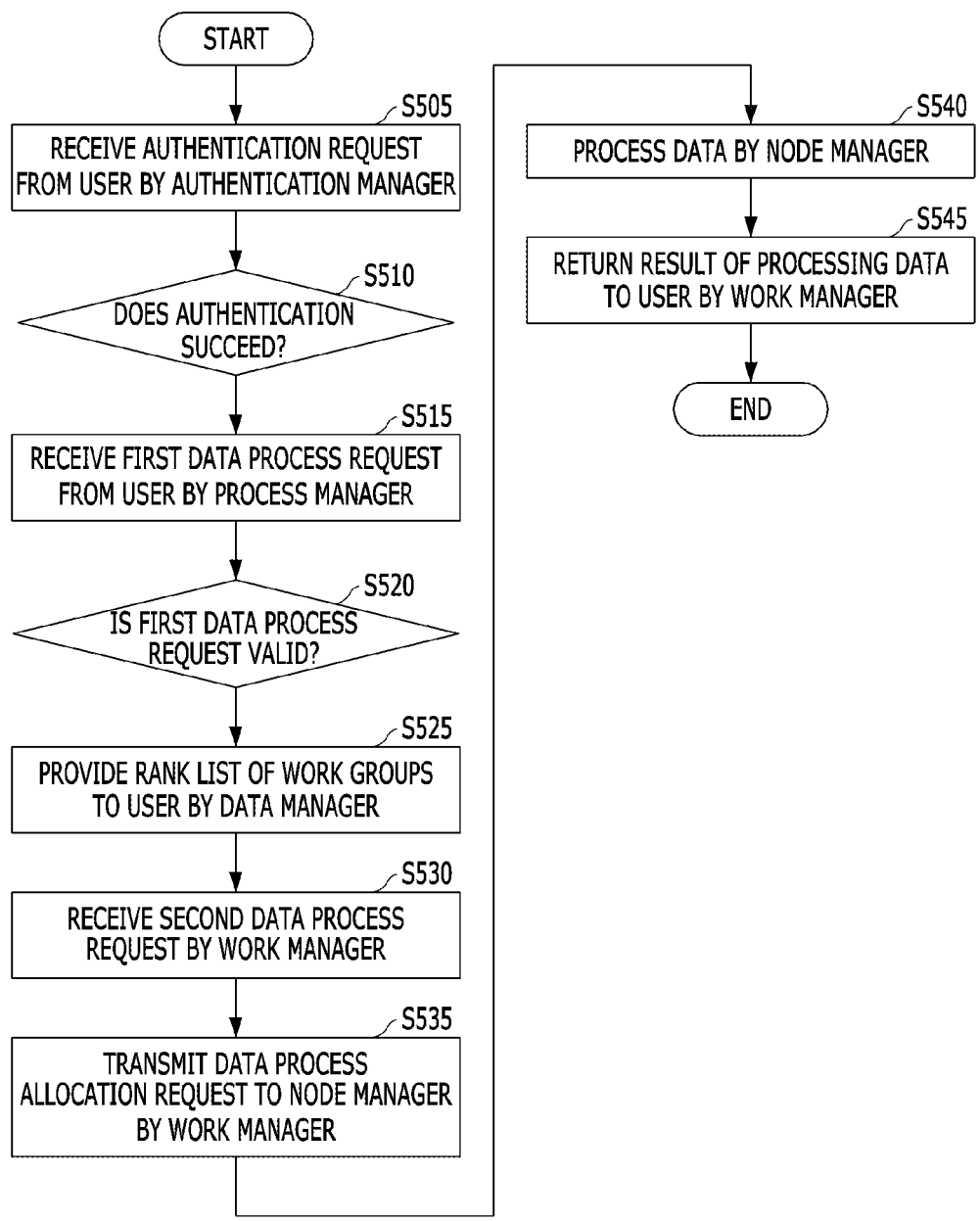
FIG. 5 is a flowchart of a data process operation of a data management method according to an exemplary embodiment of the present invention; and FIG. 6A

FIG. 5 is a flowchart of a data process operation of a data management method according to an exemplary embodiment of the present invention.

In the data process operation performed by the data management system 100 according to an exemplary embodiment of the present invention, first, when receiving an authentication request from a user, the authentication manager 114 of the master group 110 performs a user authentication process. That is, when receiving an authentication request including ID and a password from the user (operation S505), the authentication manager 114 authenticates the user, based on the user information stored in the meta data storage unit 113 (operation S510). In this case, when the authentication of the user fails, the authentication manager 114 may receive an authentication request including the ID and the password again from the user.

When the authentication of the user succeeds, the process manager 112 of the master group 110 receives, from the user, a first data process request including a process identifier and input and output data identifiers (operation S515).

In this case, the process manager 112 may determine validity of the first data process request, based on the meta data information stored in the meta data storage unit 113 (operation S520). That is, the process manager 112 may determine the validity of the first data process request, e.g., whether an access process is violated, whether a quota of resources is violated, etc. with respect to the first data process request from the user, based on the meta data information. When it is determined that the first data process request is not valid, the process manager 112 may stand by to receive the first data process request again from the user.

When it is determined that the first data process request is valid, the process manager 112 produces a list of work groups 120 appropriate to handle a first data process and arranged in a rank order, and provides the user with this list, in response to the first data process request (operation S525). In this case, the list of work groups 120 may include identifiers of the work groups 120 and identifiers of nodes included in the work groups 120. The list of work groups 120 may be produced based on at least one among location information of the user, information regarding use of resources, and information regarding the amount of works allocated to the work groups 120.

Next, when the user selects at least one work group 120 from the list of work groups 120, the work manager 121 included in the selected at least one work group 120 receives a second data process request including list information of nodes for processing data from the user (operation S530).

When receiving the second data process request from the user, the work manager 121 transmits a data process allocation request to the node manager 122 corresponding to the nodes corresponding to the list information of nodes (operation S535).

The node manager 122 receiving the data process allocation request processes the data (operation S540), and returns a result of processing the data to the user when the processing of the data is completed (operation S545).

In the above description, according to an exemplary embodiment of the present invention, operations S305 to S545 may be divided into sub-operations or combined into a smaller number of operations. Some of operations S305 to S545 may be omitted if needed. Operations S305 to S545 may be performed in an order different from that described above. Furthermore, although not described herein, the above description regarding the data management system 100 of FIG. 2 also applies to the data management method described above with reference to FIGS. 3 to 5.

Figure 6A:
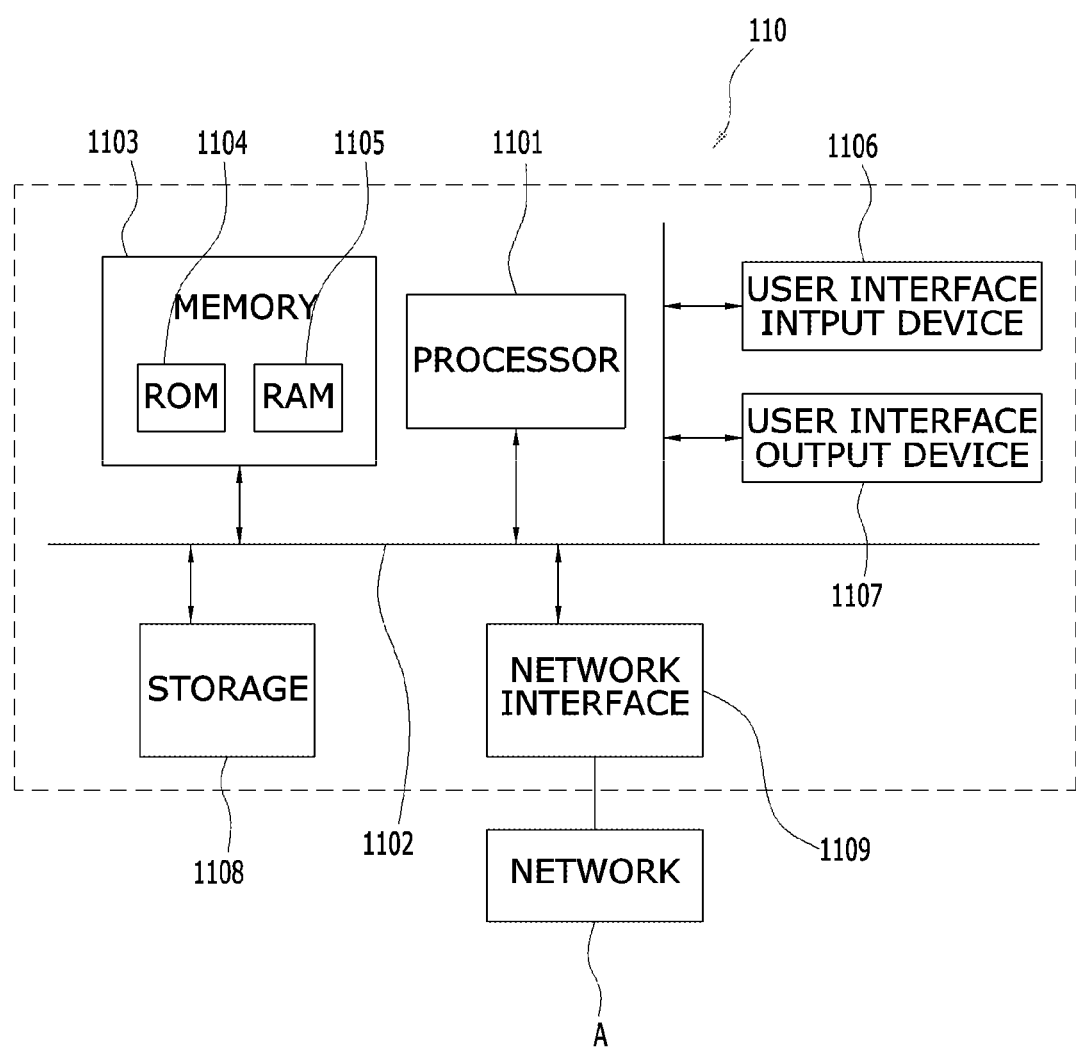
FIG. 6B is a block diagram of a master group and work group according to an exemplary embodiment of the present invention.
Figure 6B:
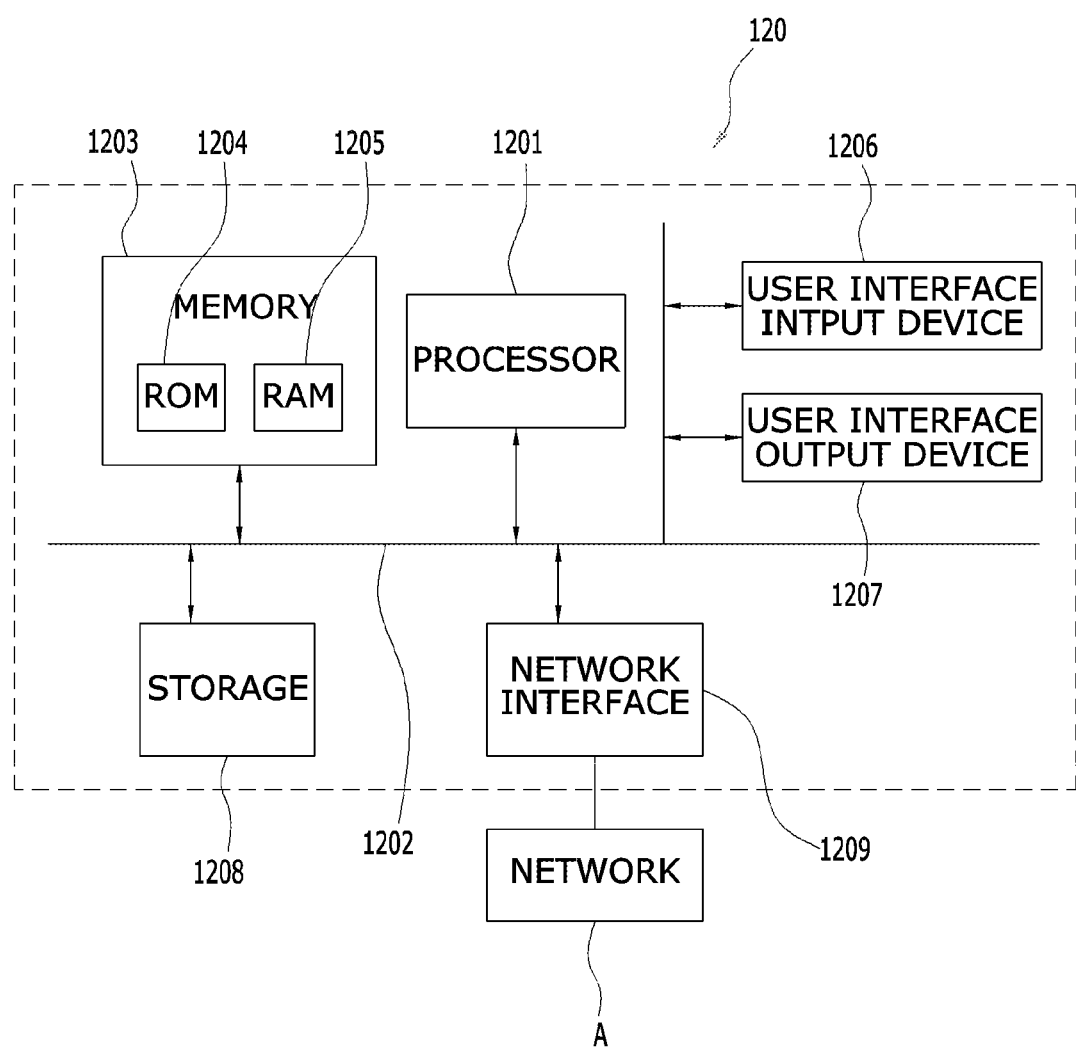

An embodiment of the present invention may be implemented in a computer system, e.g., as a computer readable medium. As shown in FIG. 6A and FIG. 6B, a computer system 110, 120 may include one or more of a processor 1101, 1201, a memory 1103, 1203, a user input device 1106, 1206, a user output device 1107, 1207, and a storage 1108, 1208, each of which communicates through a bus 1102, 1202. The computer system 110, 120 may also include a network interface 1209 that is coupled to a network A. The processor 1101, 1201 may be a central processing unit (CPU) or a semiconductor device that executes processing instructions stored in the memory 1103, 1203 and/or the storage 1108, 1208. The memory 1103, 1203 and the storage 1108, 1208 may include various forms of volatile or non-volatile storage media. For example, the memory may include a read-only memory (ROM) 1104, 1204 and a random access memory (RAM) 1105, 1205.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to one of the above exemplary embodiments, even if many data centers are geographically dispersed, information may be efficiently processed between them.

Thus, an effective and extendable data storing, accessing, and processing system may be provided to analyze a task to optimize data services from a data center.

A data management method performed by the data management system 100 according to an exemplary embodiment of the present invention may be embodied as a computer program stored in a medium run by a computer or a recording medium storing instructions which are executable by a computer. A non-transitory computer-readable recording medium may be any available medium accessible by a computer. Examples of the non-transitory computer-readable recording medium include a volatile/non-volatile medium and a separable/non-separable medium. Examples of the non-transitory computer-readable recording medium may include a computer storage medium and a communication medium. Examples of the computer storage medium include a volatile/nonvolatile medium and a separable/non-separable medium embodied according to a method or technique of storing information such as computer-readable instructions, data structures, program modules, or other data. The communication medium should be generally understood to include computer-readable instructions, data structures, program modules, other data, e.g., modulated data signals such as subcarriers, or other transfer mechanisms. An example of the communication medium includes any information transfer medium.

Although a method and system according to an exemplary embodiment of the present invention has been described above with respect to certain exemplary embodiments, some or all of elements or operations of the method and system may be realized by a computer system having a general-purpose hardware architecture.

The above description of the present invention is merely an example. It would be apparent to those of ordinary skill in the art that the present invention may be easily embodied in many different forms without changing the technical idea or essential features thereof. Thus, the above exemplary embodiments are merely examples and the present invention is not limited thereto. For example, elements of the exemplary embodiments described herein as being included in a single device may be dispersed. Similarly, elements of the exemplary embodiments described herein as being dispersed may be combined.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A data management system comprising:
   a master group including a processor, the master group configured to:
   receive, from a user, a first request indicating an operation and including a data identifier, the operation being one of a read operation, a write operation, and a process operation, and when the first request is valid:
   produce a list of appropriate work groups, the list of appropriate work groups including 1) one or more identifiers of work groups appropriate for performing the operation on the data identified by the data identifier and 2) one or more identifiers of nodes included in the identified work groups, and provide the list of appropriate work groups to the user; and
   at least one work group including a processor and a plurality of nodes, wherein the at least one work group identified in the list of appropriated work groups, the work group configure to: and
   receive, from the user, a second request specifying the operation and including a list information of nodes,
   determine, using the list information of nodes, a list of information regarding valid nodes for performing the operation,
   provide the list of information regarding valid nodes to the user,
   receive, from the user, information of at least one node selected from the valid nodes, and
   perform the operation using the selected at least one node, wherein the master group and the at least one work group are dispersed from each other.

2. The data management system of claim 1,
   wherein the master group is further configured to determine whether the first request is valid using meta data information stored in the master group, and
   wherein the meta data information comprises at least one of:
   user information;
   information regarding the at least one work group;
   information regarding an amount of works allocated to the at least one work group;
   information regarding the resources;
   information regarding an application; and
   configuration information of clusters.

3. The data management system of claim 1, wherein the master group and the at least one work group are activated by being connected to each other when a request is received from a user.

4. The data management system of claim 1, wherein when the operation is the write operation:
   the list of appropriate work groups includes one or more identifiers of work groups appropriate for writing data indicated by the data identifier and arranged in a rank order, and
   the list of appropriate work groups is produced based on at least one of:
   location information of the user;
   information regarding use of the resources; and
   information regarding an amount of works allocated to the at least one work group.

5. The data management system of claim 4, wherein when the operation is the write operation:
   the at least one work group is further configured to receive, from the user, data corresponding to the data identifier, and
   performing the operation using the selected at least one node includes writing the received data to the selected at least one node.

6. The data management system of claim 5, wherein when the operation is the write operation, performing the operation using the selected at least one node includes copying the data and transmitting the copied data to another node or to another work group.

7. The data management system of claim 6, wherein when the operation is the write operation, the copied data is transmitted to a node or work group selected randomly, selected based on a use pattern, or selected by the user.

8. The data management system of claim 6, wherein when the operation is the write operation, the at least one work group transmits location information of the copied data to the master group, and
   wherein the master group is configured to update, using the location information, meta data information stored in the master group.

9. The data management system of claim 1, wherein when the operation is the read operation:
   the list of appropriate work groups includes one or more identifiers of work groups appropriate for reading data identified by data identifier and arranged in a rank order, and
   the list of appropriate work groups is produced based on at least one of:
   location information of the user;
   information regarding use of the resources; and
   information regarding an amount of works allocated to the at least one work group.

10. The data management system of claim 9, wherein when the operation is the read operation, performing the operation using the selected at least one node includes transmitting the data identified by the data identifier to the user.

11. The data management system of claim 1, wherein when the operation is the process operation:
    the first request includes a process identifier;
    the second request includes the process identifier,
    the data identifier includes an input data identifier and an output data identifier;
    the list of appropriate work groups includes one or more identifiers of work groups appropriate to handle a process corresponding to the process identifier and arranged in a rank order; and
    the list of appropriate work groups is produced based on at least one of:
    location information of the user;
    information regarding use of the resources; and information regarding an amount of works allocated to the work groups.

12. The data management system of claim 11, wherein when the operation is the process operation, perform the operation includes transmitting a data process allocation request to a node manager corresponding to the selected at least one node, wherein the node manager includes a processor and is configured to process data identified by the data identifier in response to receiving the data process allocation request.

13. The data management system of claim 1, wherein the master group is further configured to authenticate the user in response to an authentication request from the user, and wherein receive, from the user, the first request is performed after authenticating the user.

14. A data management method performed by a data management system, comprising:

receiving, by a master group from a user, a first request from a user, the first request including an indication of data and indicating an operation, the operation being one of a read operation, a write operation, and a process operation;

producing a list of work groups corresponding to the first request, and arranged in a rank order, the list of work groups including one or more identifiers of work groups and a list of nodes included in the identified work groups;

providing, to the user by the master group, the list of work groups;

receiving, from the user by at least one work group identified in the list of work groups, a second request indicating the operation and including list information of nodes;

when the operation is the write operation or the read operation, transmitting, by the at least one work group, information regarding valid nodes to the user in response to the second request, based on the list information of nodes; and when the operation is the process operation, processing, by the at least one work group, the data according to the list information of nodes, wherein the master group and the at least one work group are dispersed from each other.

15. The data management method of claim 14, wherein when the operation is the write operation, the list information of nodes indicates on or more nodes to which the data is to be written, wherein when the operation is the read operation, the list information of nodes indicates on or more nodes from which the data is to be read, and wherein when the operation is the read operation, the list information of nodes indicates one or more nodes for processing the data.

16. The data management method of claim 15, further comprising:

when the operation is the read operation, reading the data from a node indicated by the list information of nodes and providing the read data to the user;

when the operation is the write operation, writing the data to a node indicated by the list information of nodes; and when the operation is the process operation, returning a result of processing the data to the user.

* * * * *